US 12,078,450 B2

United States Patent
McKendrick et al.

(10) Patent No.: US 12,078,450 B2
(45) Date of Patent: Sep. 3, 2024

(54) HOLSTER TENSIONER DEVICE

(71) Applicant: Safariland, LLC, Jacksonville, FL (US)

(72) Inventors: Matthew E. McKendrick, Jacksonville, FL (US); Robert DeRenzo, Saint Johns, FL (US)

(73) Assignee: Safariland, LLC, Jacksonville, FL (US)

( * ) Notice: Subject to any disclaimer, the term of this patent is extended or adjusted under 35 U.S.C. 154(b) by 21 days.

(21) Appl. No.: 18/104,901

(22) Filed: Feb. 2, 2023

(65) Prior Publication Data

US 2023/0296350 A1  Sep. 21, 2023

Related U.S. Application Data

(60) Provisional application No. 63/357,324, filed on Jun. 30, 2022, provisional application No. 63/354,127, filed on Jun. 21, 2022, provisional application No. 63/320,424, filed on Mar. 16, 2022.

(51) Int. Cl.
  *F41C 33/02* (2006.01)
(52) U.S. Cl.
  CPC ...... *F41C 33/0263* (2013.01); *F41C 33/0236* (2013.01)
(58) Field of Classification Search
  CPC .. F41C 33/0263; F41C 33/0209; F41C 33/04; Y10S 224/911; Y10S 224/912
  USPC ................................ 224/242, 243, 245, 246
  See application file for complete search history.

(56) References Cited

U.S. PATENT DOCUMENTS

| | | | | |
|---|---|---|---|---|
| 2,783,536 A | * | 3/1957 | Mcqueary | ............. B26B 29/025 224/675 |
| 5,944,239 A | * | 8/1999 | Rogers | ................ F41C 33/0209 224/193 |
| 6,357,645 B1 | * | 3/2002 | Keefe | ..................... B60R 11/00 224/567 |

(Continued)

FOREIGN PATENT DOCUMENTS

| CN | 2502231 Y | 7/2002 |
|---|---|---|
| EP | 0840878 B1 | 6/2002 |

OTHER PUBLICATIONS

European Patent Application No. 23161414.0—Extended European Search Report dated Jul. 13, 2023.

(Continued)

*Primary Examiner* — Corey N Skurdal
(74) *Attorney, Agent, or Firm* — Kane Kessler, P.C.; Paul E. Szabo

(57) ABSTRACT

A holster for a handgun assembly includes a holster body having a chamber for receiving the handgun assembly. A tensioner is mounted on the holster body in a position to be engaged by the handgun assembly in the chamber, and is operable to apply a resilient biasing force to the handgun assembly in the chamber. The tensioner includes tensioner body that is engaged and deformed by the handgun assembly, and a spring for resisting and controlling deformation of the tensioner body. The tensioner has a first end portion mounted on the holster body for only rotational movement on the holster body, and a second end portion mounted on the holster body for both sliding and rotational movement on the holster body. A tension spring maintains tension on the tensioner body.

10 Claims, 9 Drawing Sheets

(56) References Cited

U.S. PATENT DOCUMENTS

| | | | |
|---|---|---|---|
| 7,694,860 B2 | 4/2010 | Clifton, Jr. | |
| 9,194,679 B2 * | 11/2015 | Orozco | F42B 39/02 |
| 9,322,612 B2 | 4/2016 | Clifton, Jr. | |
| 10,317,169 B2 | 6/2019 | McKendrick | |
| 10,712,124 B2 * | 7/2020 | Courtney | F41C 33/04 |
| 11,499,798 B2 * | 11/2022 | Courtney | F16M 11/04 |
| 2013/0306691 A1 * | 11/2013 | Baumann | F41C 33/0263 |
| | | | 224/244 |
| 2018/0164072 A1 | 6/2018 | McKendrick | |
| 2019/0346233 A1 | 11/2019 | Rorick | |
| 2020/0232755 A1 | 7/2020 | Houck et al. | |

OTHER PUBLICATIONS

Australian Patent Application No. 2023201167—Examination Report No. 1 dated Feb. 16, 2024.

* cited by examiner

HOLSTER TENSIONER DEVICE

RELATED APPLICATIONS

This application claims priority to U.S. Provisional Application No. 63/320,424 filed Mar. 16, 2022; U.S. Provisional Application No. 63/354,127 filed Jun. 21, 2022; and U.S. Provisional Application No. 63/357,324 filed Jun. 30, 2022.

BACKGROUND OF THE INVENTION

A typical handgun holster includes a body portion defining a chamber having an opening. The handgun is inserted, muzzle first, through the opening into the chamber. The handgun is thereby received and supported in the body portion of the holster.

It is desirable for the handgun to be positioned and retained in the chamber by means other than a tight fit of the handgun itself in the holster. To that end, some holsters incorporate a tensioning device. The tensioning device engages the handgun inside the chamber, for example engaging the muzzle of the trigger guard. The engagement between the tensioning device and the handgun helps to position the handgun in the holster, and also helps to resist inadvertent movement of the handgun out of the holster.

Holsters with adjustable tensioning devices are known, such as those shown in U.S. Pat. Nos. 7,694,860, 9,322,612, and 10,317,169. Most of these tensioning devices do not automatically adjust themselves for handguns of different sizes and configurations. Some are not suitable for use with a handgun that carries a light located under the muzzle and hanging down below the trigger guard. Also, some utilize a plastic tensioning member that is flexed and kept under tension for long periods of time. The plastic material will eventually relax and lose the residual stresses in the material under load, thus losing tension and allowing the weapon to rattle.

The spring maintains this tension and doesn't permit the lever to relax under a continuous load, while also allowing the lever to flex to whatever position is necessary, depending on the size of the light attached, and still maintain and constant, positive pressure.

BRIEF DESCRIPTION OF THE DRAWINGS

Further features of the invention will become apparent to one of ordinary skill in the art to which the invention pertains when reading the following description of embodiments of the invention together with the drawings, in which.

DESCRIPTION OF EMBODIMENTS OF THE INVENTION

Figure 1:
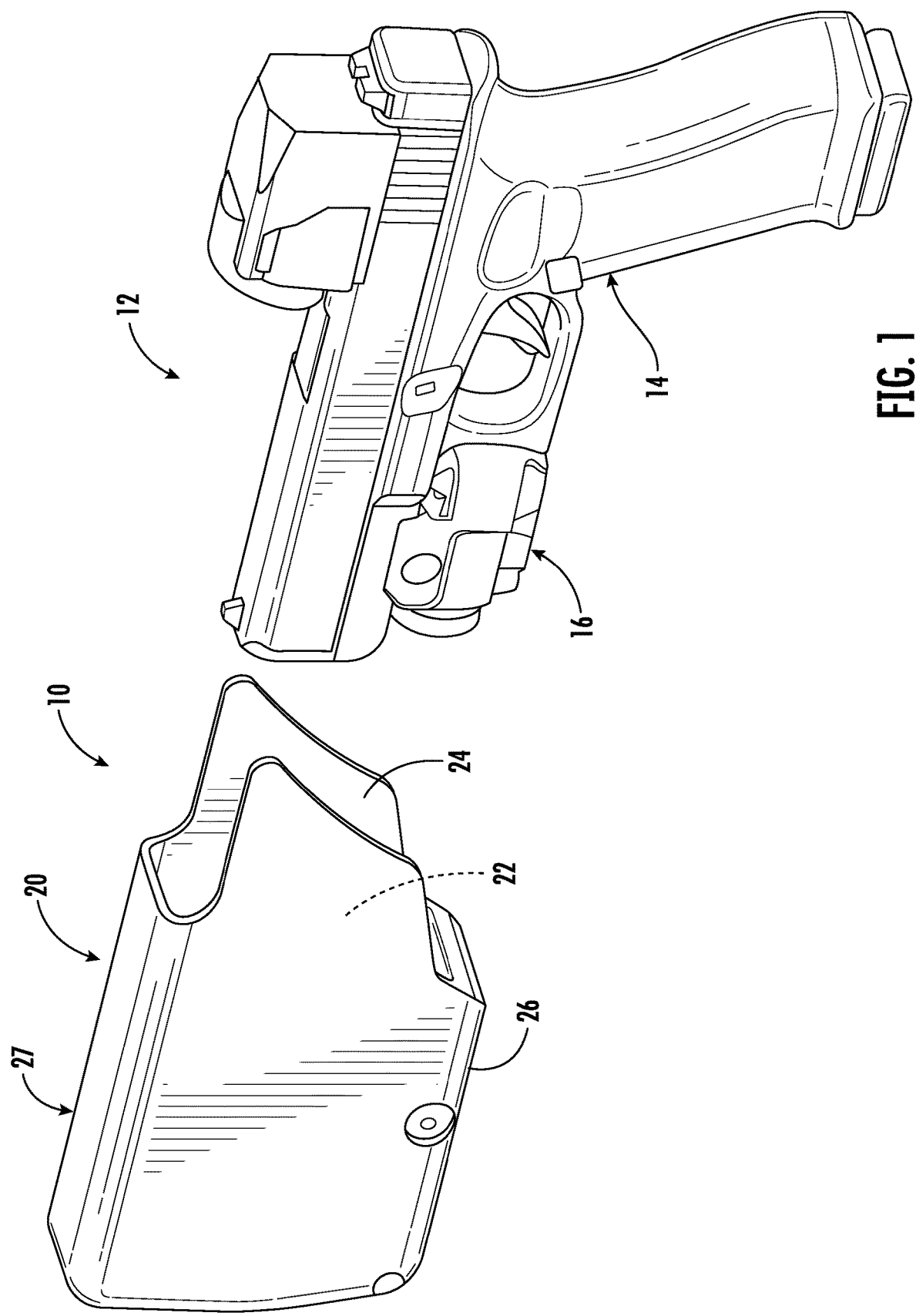
FIG. 1 is a schematic perspective view of a holster including a tensioner in accordance with a first embodiment of the present invention, shown with a handgun outside of the chamber of the holster and out of engagement with the tensioner, with the handgun having a light mounted below the muzzle and the tensioner being mounted on the bottom wall of the holster body in a position to engage the light.
Figure 2:
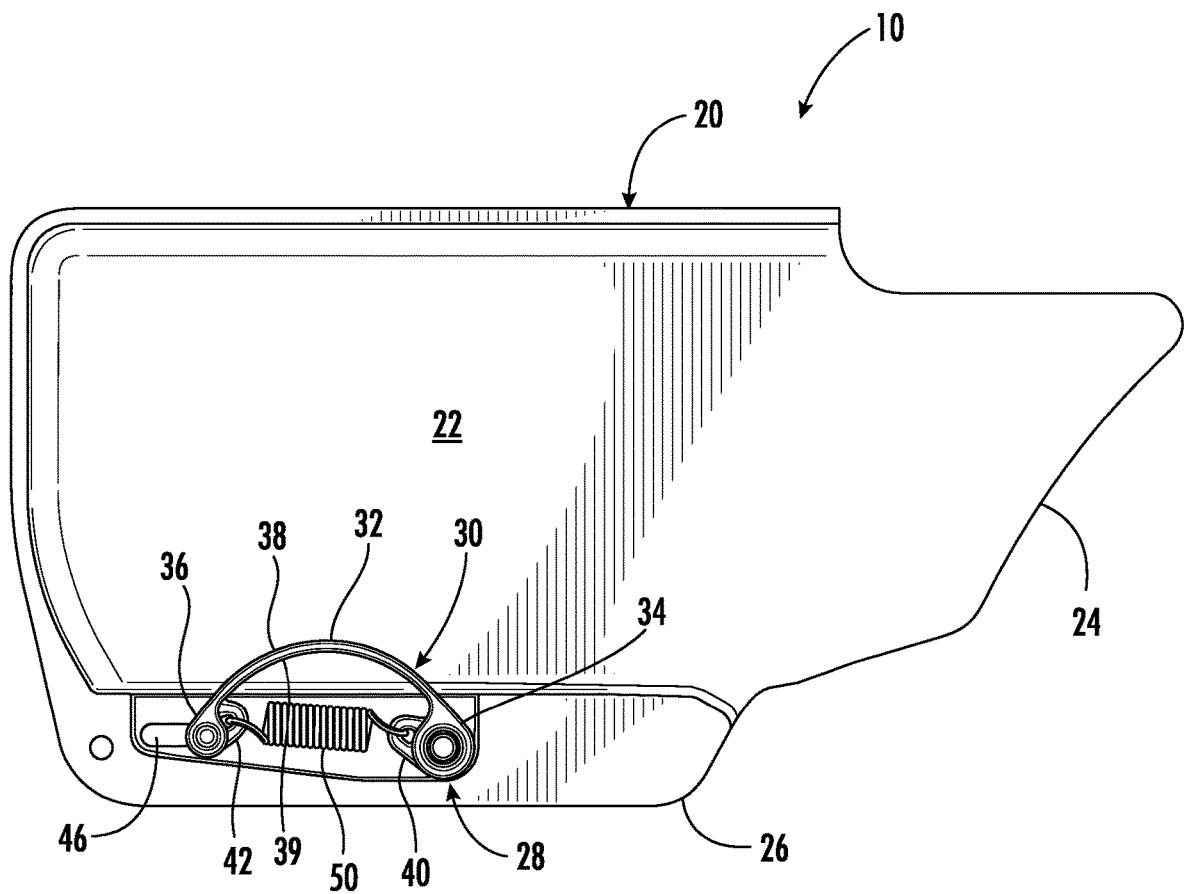
FIG. 2 is an elevational view of the tensioner of FIG. 1.
Figure 3:
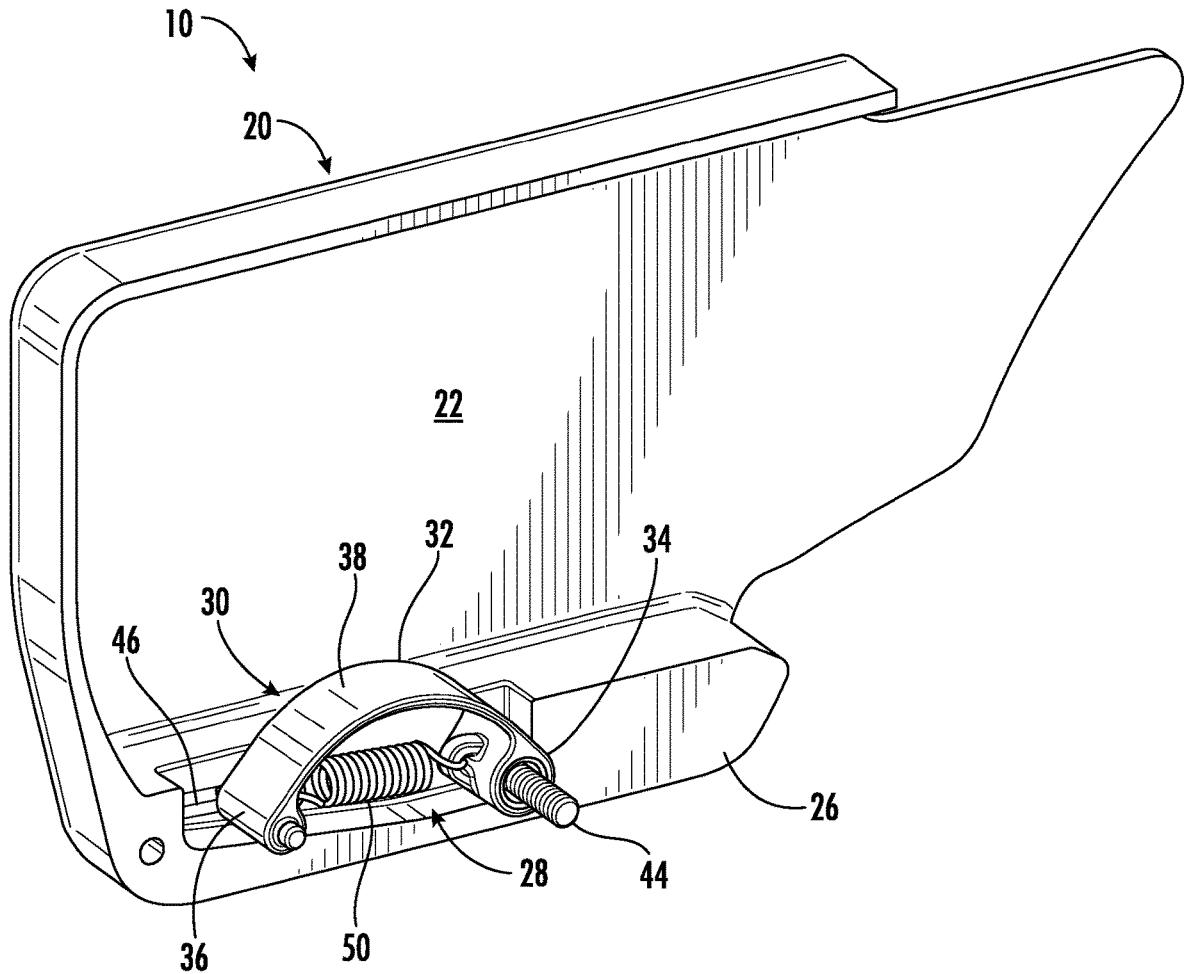
FIG. 3 is a perspective view of the tensioner of FIG. 1.

FIGS. 1-6 illustrate a handgun holster 10 that is a first embodiment of the invention. The holster 10 is adapted to receive a handgun assembly 12. The handgun assembly 12 includes a handgun 14. The handgun assembly 12 that is illustrated herein also includes a light 16 that is mounted on the handgun below the handgun muzzle. Some handgun assemblies would not include a light mounted below the muzzle, but could include only the weapon itself.

The holster 10 (FIG. 1) includes a holster body 20 that defines a chamber 22 for receiving the handgun 14. The holster 10 has an entranceway or opening 24 into the chamber 22 for allowing insertion of the handgun 14 into the holster. The holster body 20 has a bottom wall 26 and a top wall 27.

It is desirable that the handgun assembly 12 be positioned and retained in the chamber 22 in a way other than by a tight fit of the handgun itself in the holster 10. To that end, the holster 10 includes a tensioner assembly 28 mounted on the holster body 20 in a position to be engaged by the handgun assembly 12 when the handgun is inserted in the chamber 22. The tensioner assembly 28 is operable, as described below, to apply a resilient biasing force to the handgun assembly 12 when it is located in the chamber 22. In this first embodiment, the tensioner assembly 28 is mounted on the bottom wall 26 of the holster body 20 in a position to engage the light 16.

The tensioner assembly 28 in this embodiment includes two elements—a tensioner body 30, and a tensioner spring 50. The tensioner body 30 (FIGS. 4-6) is a stiff but resilient element, in this case made from plastic, and is preferably formed as one piece, for example by molding. The tensioner body 30 is mounted on the bottom wall 26 of the holster body 20 in a manner as described below.

The tensioner body 30 has an elongate handgun engagement portion or central portion 32, extending between first and second end portions 34 and 36. In this embodiment, the central portion 32 has a generally arcuate configuration, concave downward toward the outside (exterior) of the holster 10. The central portion 32 has an outer side surface 38 that is presented toward the holster chamber 22, and an opposite inner side surface 39.

The first end portion 34 of the tensioner body 30 is formed as a hollow circular cylinder, from which a first spring loop 40 extends toward the second end portion 36. The second end portion 36 of the tensioner body 30 is formed as a transversely extending pin, from which a second spring loop 42 extends toward the first end portion 34.

The holster body bottom wall 26 includes a cylindrical mounting boss 44 on which is supported the first end portion 34 of the tensioner body 30. The first end portion 34 of the tensioner body 30 is closely fitted on the boss 44, and is rotatable on the boss without translational movement.

At the opposite end of the tensioner body 30, the pin 41 on the second end portion 36 is fitted into a slot 46 in the holster body bottom wall 26. The slot 46 extends longitudinally, that is, along the insertion and withdrawal direction of the handgun 14. The second end portion 36 of the tensioner body 30 is both (i) rotatable (pivotable) relative to the holster body 20, and (ii) slidable (translatable) along the length of the slot 46. These two degrees of freedom can be seen, for example, in a comparison of FIGS. 4 and 5.

The spring 50 extends in a force-transmitting relationship between the two end portions 32 and 34 of the tensioner body 30. Specifically, one end of the spring 50 is connected to the first spring loop 40, and the second end of the spring is connected to the second spring loop 42. The spring 50 thus is located generally inside of and parallel to the central portion 32 of the tensioner body 30. In the illustrated embodiment, the spring 50 is a tension spring which resists elongation, that is, it resists movement of the two tensioner body end portions 32 and 24 away from each other. In another embodiment (not shown), the spring 50 may be a compression spring, mounted outside the tensioner body 30.

The outer side surface 38 (FIGS. 2 and 3) of the tensioner body central portion 32 is presented toward the chamber 22 of the holster body. The central portion 32 of the tensioner body projects upward into the chamber 22 of the holster 10, through an opening in the bottom wall 26 of the holster body 20, as seen for example in FIG. 6. The location of the tensioner body 30 in the holster 10 is such that outer side surface 38 of the tensioner body central portion 32 is engageable by the handgun assembly 12 (in this case, the light 16) when the handgun assembly is located in the chamber 22.

When the handgun assembly 12 is inserted into the holster 10, a lower surface on the handgun assembly engages the outer side surface 38 of the tensioner central portion 32. In the illustrated embodiment, it is a surface on the light 16 that engages the tensioner body 30. In other embodiments, it may be another portion of the handgun assembly 12, for example, the trigger guard of the handgun 14. The arcuate tensioner central portion 32 has a large radius to provide a smooth engagement with the handgun assembly 12 during insertion and removal of the handgun 14.

Figure 4:
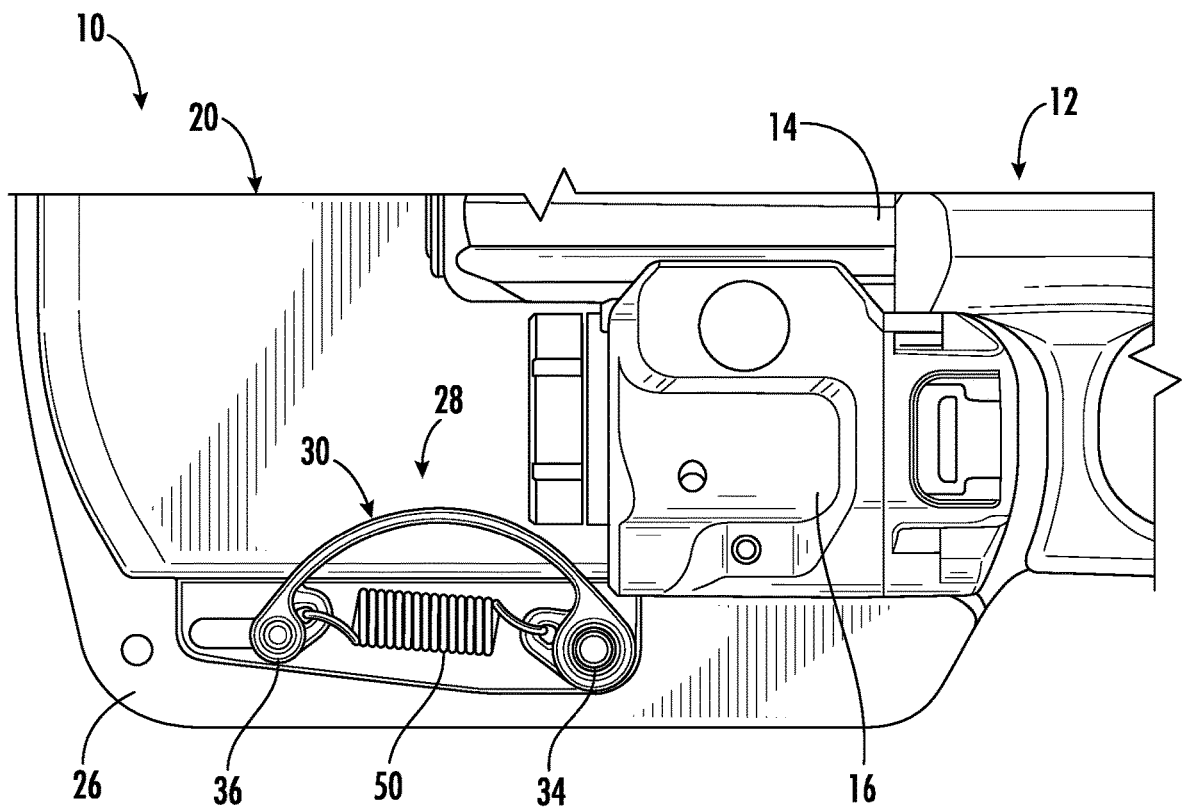
FIG. 4 is an elevational view showing the handgun being inserted into the holster and the light coming into engagement with the tensioner.
Figure 5:
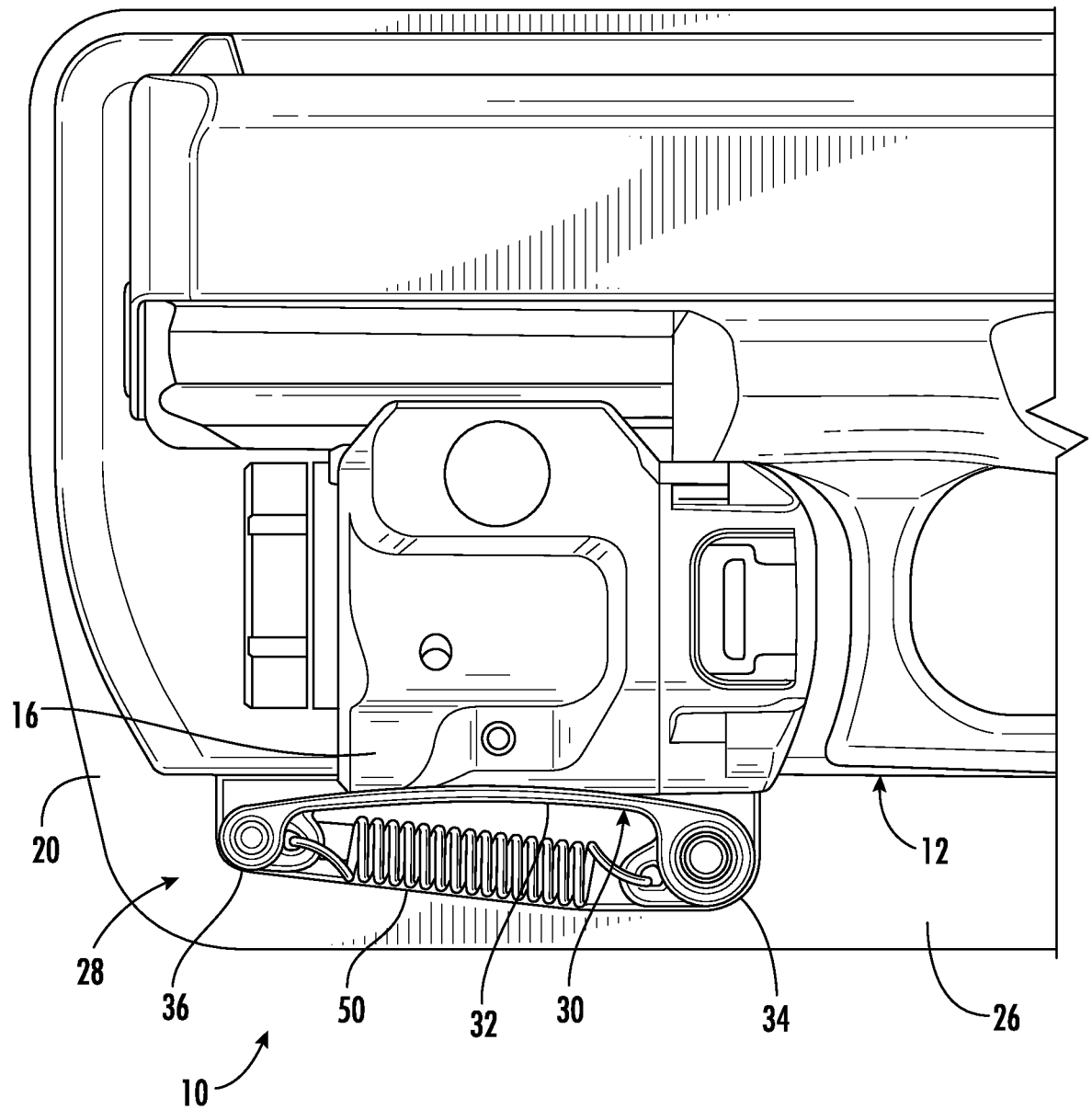
FIG. 5 is a view similar to FIG. 3 showing the handgun fully inserted into the holster and the tensioner fully engaged by the light.
Figure 6:
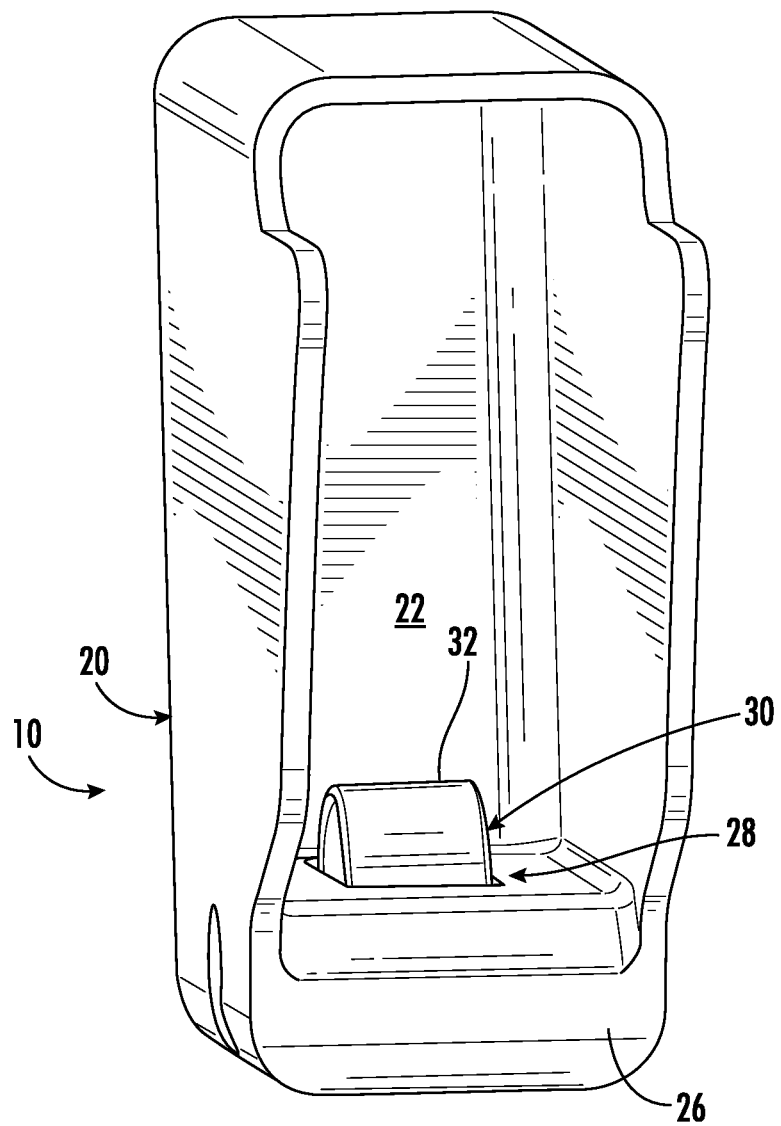
FIG. 6 is a view of the tensioner as seen from the entranceway of the holster chamber.
Figure 7:
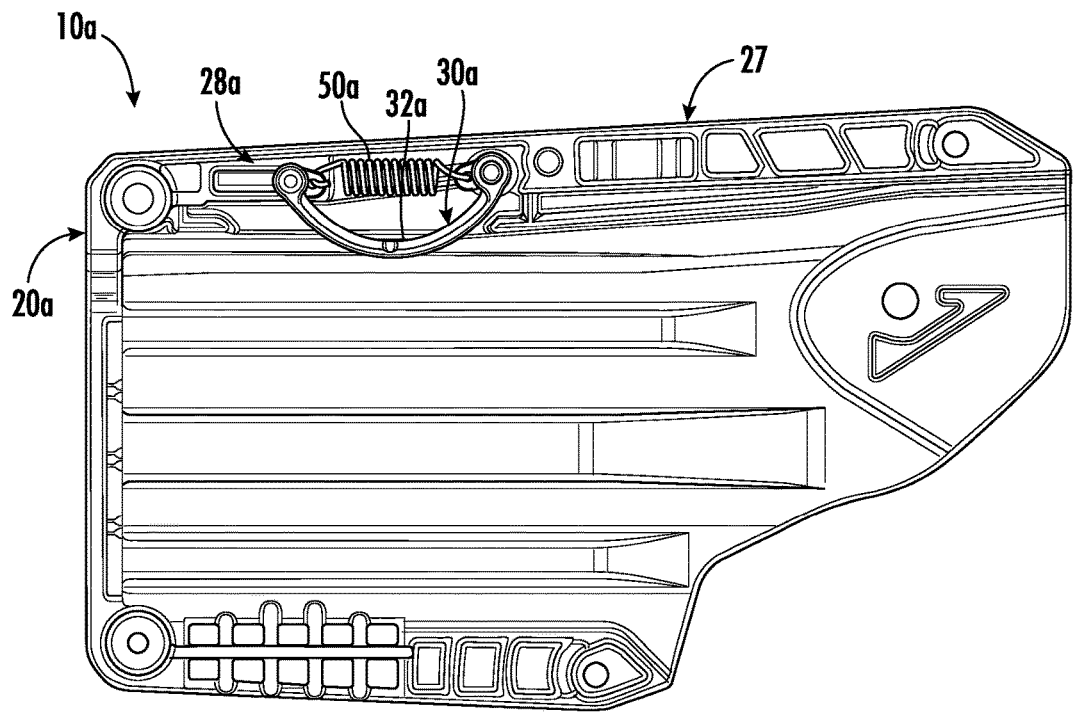
FIGS. 7-10 illustrate a second embodiment of the invention, in which the tensioner is mounted on the top wall of the holster body.
Figure 8:
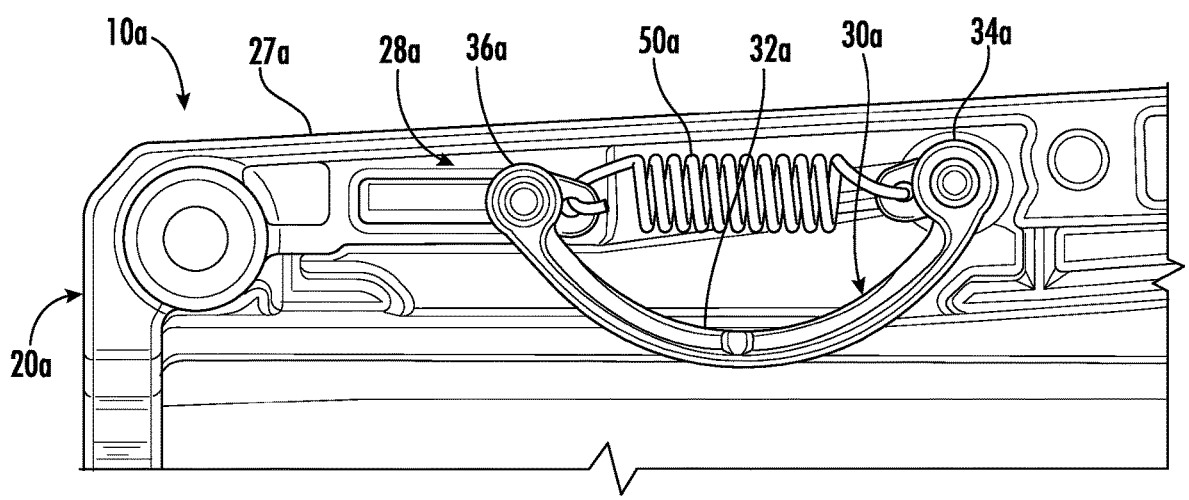
Figure 9:
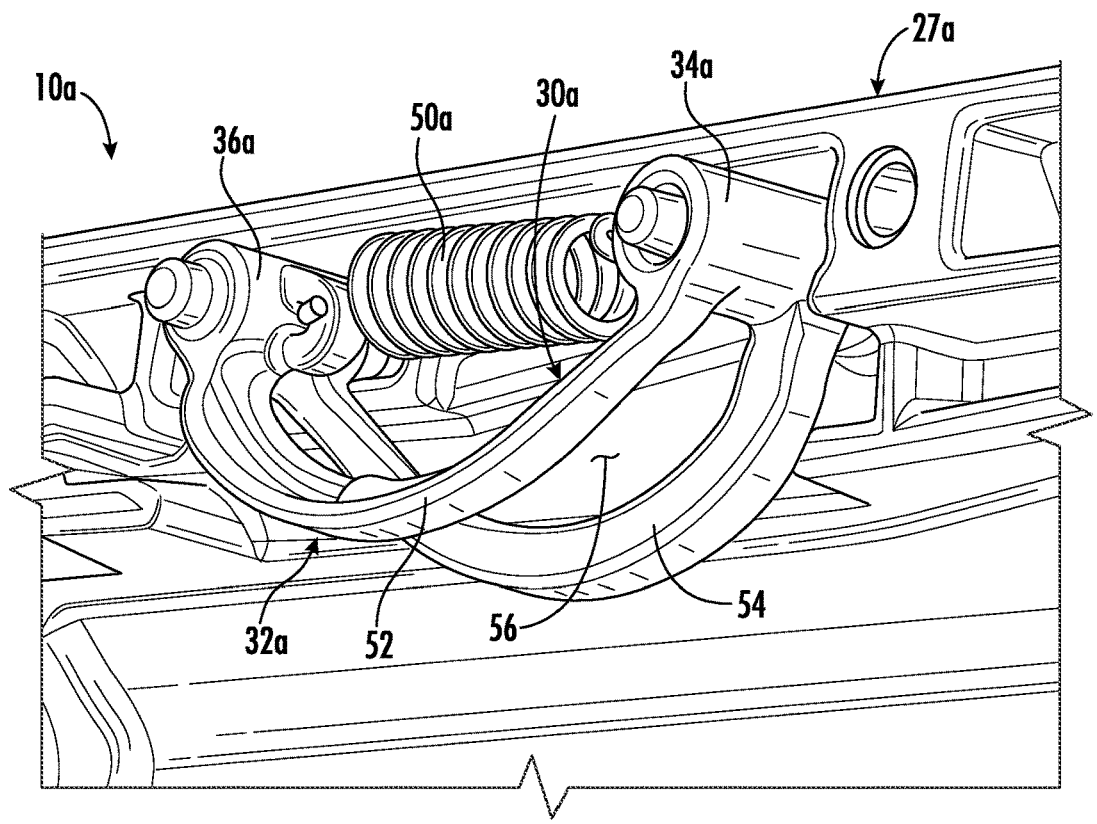
Figure 10:
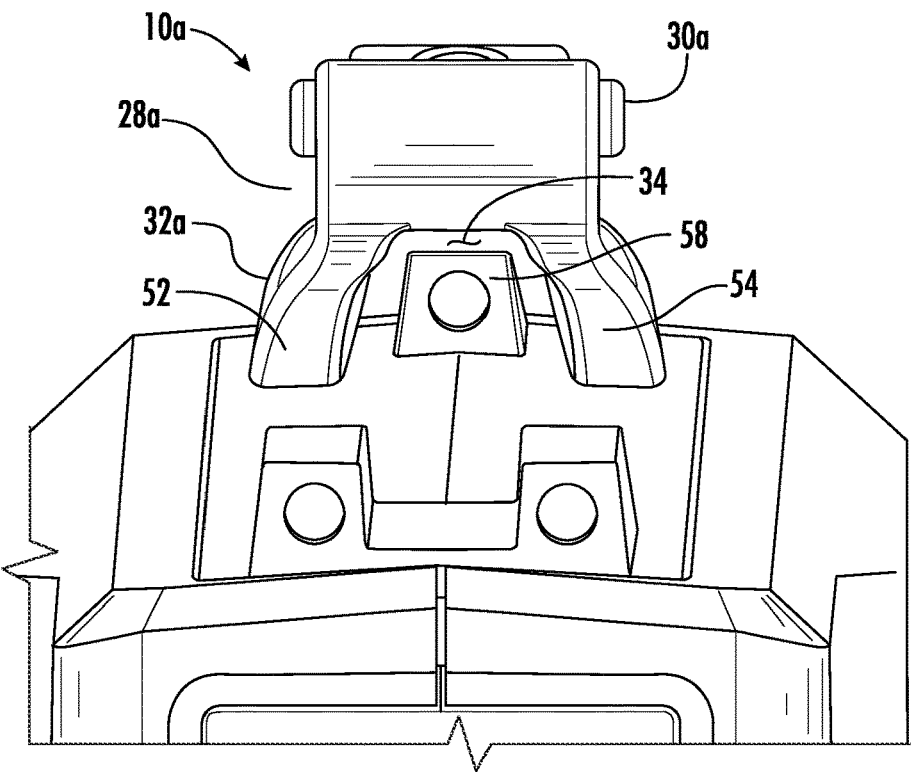

The force exerted on the tensioner body 30 when the handgun assembly 12 engages the tensioner central portion 32 causes the central portion to be resiliently deformed downward and flatten out partially or completely, as can be seen from a comparison of FIGS. 4 and 5. This flattening action occurs because the tensioner body end portions 34 and 36 can be moved away from each other, against the bias of the spring 50. Specifically, the force exerted on the tensioner body 30 produces only rotational movement of the tensioner first end portion 34 on the holster body 20; while at the same time, it produces both sliding and rotational movement of the tensioner second end portion 36 on the holster body, in a direction away from the first end portion. The second end portion 36 slides away from the first end portion 34, enabling the central portion 32 to flatten.

The engagement between the tensioner body 30 and the handgun assembly 12 helps to position the handgun in the holster 10, and also helps to resist inadvertent movement of the handgun out of the holster. Because of the resilience of the tensioner body 30, the handgun 14 does not have to be perfectly aligned with the holster 10 when the handgun is inserted into the chamber 22, in order for the full effect of the tensioner assembly 28 to be made available. Rather, the tensioner body can adjust and reposition itself so as to both position the handgun properly and help to secure it in the holster.

When the handgun assembly 12 is thereafter removed from the holster 10, the spring 50 pulls the second end portion 36 of the tensioner body 30 back toward the first end portion 34. The tensioner body 30 assumes its starting position again.

The range of motion of the tensioner body 30, from compressed to extended, can be selected to accommodate handgun assemblies of different sizes and configurations. The central portion 32 of the tensioner 30 can be more or less curved or flattened, depending on how far it is pressed by engagement with the handgun assembly 12. As a result, the tensioner assembly 28 of the present invention adjusts automatically for whatever handgun assembly 12 is inserted. In all embodiments, the amount of tension produced, can be selected to provide the desired amount of resistance to withdrawal of the handgun 14 from the holster 10.

As noted above with respect to the prior art, a plastic tensioning member that is flexed and kept under tension for long periods of time will eventually relax and lose the residual stresses in the material under load, thus losing tension and allowing the weapon to rattle. In the present invention, the spring 50 maintains this tension on the tensioner body 30 and does not permit it to relax under a continuous load, while also allowing it to flex to whatever position is necessary, depending on the size of the light attached, and still maintain and constant, positive pressure.

FIGS. 7-10 illustrate a handgun holster 10a that is a second embodiment of the invention. The holster 10a is similar to the holster 10. Parts of the holster 10a that are the same or similar are given the same reference numeral with the suffix "a" added to distinguish them.

The holster 10a includes a different tensioner assembly 28a, and the tensioner assembly 28a is mounted inside or otherwise on the top wall 27a of the holster body. The tensioner assembly 28a includes a tensioner body 30a having a central portion 32a that is split into two legs 52 and 54, with a gap 56 between them, to accommodate the passage of a front sight 58 of a handgun.

The tensioner assembly 28a functions in a similar manner to the tensioner assembly 28. When the handgun is inserted, its front sight 58 passes between the two legs 33 of the tensioner body 30a. The tensioner body 30a engages an upper portion of the handgun to position the handgun in the holster 10a and to resist inadvertent movement of the handgun out of the holster.

Figure 11:
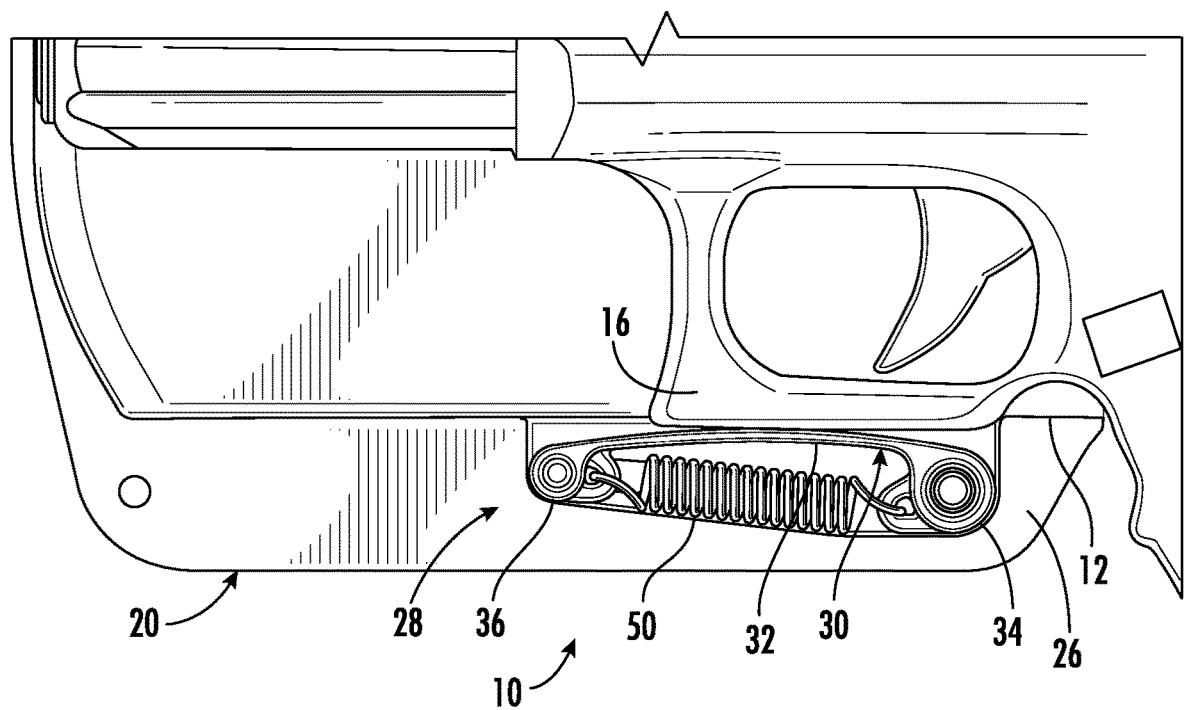
FIG. 11 illustrates a third embodiment of the invention, in which the tensioner is mounted on the bottom wall of the holster body in a position to engage the trigger guard of the handgun.

A tensioner assembly 28 can be placed to engage the trigger guard of an inserted handgun 12 rather than the light 16. This is illustrated in FIG. 11, with the tensioner assembly 28 being located farther rearward (to the right as viewed in FIG. 11) on the bottom wall 26 of the holster body 20.

From the above description of the invention, those skilled in the art will perceive improvements, changes and modifications. Such improvements, changes and modifications within the skill of the art are intended to be covered by the appended claims.

The invention claimed is:

1. A holster for a handgun assembly, the holster including:
 a holster body having a chamber for receiving the handgun assembly; and
 a tensioner mounted on the holster body in a position to be engaged by the handgun assembly in the chamber, the tensioner being operable to apply a resilient biasing force to the handgun assembly in the chamber;
 the tensioner including a tensioner body that is engaged and deformed by the handgun assembly, and a spring for resisting and controlling deformation of the tensioner body.

2. A holster as set forth in claim 1 wherein the tensioner body has a resilient handgun engagement portion extending between first and second end portions, the tensioner first end portion is mounted on the holster body for only rotational movement on the holster body, and the tensioner second end portion is mounted on the holster body for both sliding and rotational movement on the holster body.

3. A holster as set forth in claim 2 wherein engagement of the handgun assembly with the handgun engagement portion of the tensioner body causes the tensioner body second end portion to slide away from the tensioner body first end portion, enabling the tensioner body central portion to flatten.

4. A holster as set forth in claim 2 wherein the spring is a tension spring that extends between the first and second end portions of the tensioner body and that maintains tension on the tensioner body and does not allow the tensioner body to relax under a continuous load.

5. A holster as set forth in claim 2 wherein the handgun engagement portion has a generally arcuate configuration that is concave downward toward the outside of the holster and an outer side surface that is presented toward the holster chamber for engagement by the handgun assembly.

6. A holster as set forth in claim 1 wherein the tensioner is mounted on a bottom wall of the holster body.

7. A holster as set forth in claim 6 wherein the tensioner is mounted in a location on the bottom wall to engage a light that is carried by a handgun.

8. A holster as set forth in claim 6 wherein the tensioner is mounted in a location on the bottom wall to engage a trigger guard of a handgun.

9. A holster as set forth in claim 1 wherein the tensioner is mounted on a top wall of the holster body.

10. A holster as set forth in claim 1 wherein the tensioner body has a resilient handgun engagement portion extending between first and second end portions, the tensioner first end portion is mounted on the holster body for only rotational movement on the holster body, and the tensioner second end portion is mounted on the holster body for both sliding and rotational movement on the holster body; wherein engagement of the handgun assembly with the handgun engagement portion of the tensioner body causes the tensioner body second end portion to slide away from the tensioner body first end portion, enabling the tensioner body central portion to flatten; and wherein the spring is a tension spring that extends between the first and second end portions of the tensioner body and that maintains tension on the tensioner body and does not allow the tensioner body to relax under a continuous load.

* * * * *